United States Patent [19]

Kollmeyer

[11] 3,956,920

[45] May 18, 1976

[54] DUAL FUNCTION PRESSURE TRANSDUCER

[76] Inventor: Herman Richard Kollmeyer, 3090 Arlington Ave., Riverside, Calif. 92506

[22] Filed: Apr. 14, 1975

[21] Appl. No.: 568,077

[52] U.S. Cl. ............................ 73/398 AR; 73/406; 338/42; 338/200
[51] Int. Cl.² .......................................... G01L 9/02
[58] Field of Search ........... 73/398 AR, 396, 407 R, 73/406; 338/200, 42; 200/83 R

[56] References Cited
UNITED STATES PATENTS

| | | | |
|---|---|---|---|
| 2,437,473 | 3/1948 | Ogden et al. | 200/83 R |
| 3,144,531 | 8/1964 | Cosby | 200/83 R |

Primary Examiner—Donald O. Woodiel

[57] ABSTRACT

A dual function pressure transducer capable of providing an instantaneous pressure reading, and also of indicating when a sensed pressure crosses a predetermined selectable threshold level. A mechanical pressure sensing device causes an electrical contact member to wipe against a resistance element in response to changes in the sensed pressure, the element and contact being connected in a first electric circuit that provides a pressure readout determined by the location of the contact along the element. The contact is carried by a switch-arm that cooperates with an adjustable switch-pole means to switch a second circuit between first and second modes when the contact crosses a particular point along its path, the location of which is determined by the switch-pole setting.

10 Claims, 7 Drawing Figures

DUAL FUNCTION PRESSURE TRANSDUCER

BACKGROUND OF THE INVENTION

This invention relates to pressure transducers, and more particularly to transducers capable of indicating both pressure magnitude and the crossing of a pressure threshold.

In certain pressure transducer applications it is necessary to read the absolute pressure magnitude only when the pressure has crossed a threshold level and moved into a dangerous or undesirable region. For example, telephone lines are often surrounded by an outer protective conduit, the interior of which is maintained at a greater than atmospheric pressure. Should any leaks develop in the conduit an outward gas flow is established, rather than a flow in the reverse direction, thereby preventing the transmittal of atmospheric contaminants to the telephone lines. So long as the interior conduit pressure is maintained above a minimum level necessary to protect the lines, the absolute pressure level is not critical. Should the interior pressure fall below that level, however, it is highly desirable that a reading of the absolute pressure level be obtained in order to know the severity of the situation and also to aid in locating the leak.

A popular solution to this problem found in the prior art involves the use of a single purpose pressure transducer (i.e., a transducer having an absolute pressure but not a threshold capability), modified so as to monitor the pressure level and provide a signal when the level falls below a given threshold. The monitoring apparatus typically takes the form of solid state circuitry housed within the transducer and connected with an alarm circuit to a remote sensing station. The circuit monitors the transducer output and produces an appropriate signal when that output crosses the threshold. While such a dual function device can operate successfully, the electronic circuitry adds significantly to the total transducer cost, especially when provision is made in the trnasducer for field adjustment of the threshold level in order to enable standardization of the manufactured product and flexibility of application.

SUMMARY

In view of the above stated problems associated with the prior art, it is an object of the present invention to provide a novel and improved pressure transducer having the dual capability of providing a pressure readout signal and indicating the crossing of a pressure threshold.

Another object is the provision of a novel and improved dual function pressure transducer having inexpensive yet accurate and reliable means for indicating the crossing of a pressure threshold.

Still another object is the provision of such a dual function pressure transducer, in which a mechanical switch device is employed to indicate the crossing of a pressure threshold.

A further object is the provision of a novel and improved dual function pressure transducer having a mechanical threshold indicating device that is readily adjustable to allow resetting of the threshold level after the transducer has been installed.

In the accomplishment of these and other objects of the invention, a pressure sensing device adapted for displacement relative to the magnitude of a sensed pressure is coupled to an electrical contact member to move the member along a predetermined path, the particular location of the member at any given time being determined by the magnitude of the sensed pressure. The member wipes against the surface of a resistance element and is electrically connected therewith in an electrical circuit having a total resistance determined by the location of the member along the element. A pressure magnitude readout is obtained by measuring the circuit resistance.

The contact member is carried by a switch-arm which cooperates with an adjustable switch-pole in a threshold detect circuit. Switching takes place when the switch-arm moves under the influence of the pressure sensing device and crosses a pre-settable location corresponding to the desired threshold pressure level, placing the threshold detect circuit in a mode indicative of the pressure threshold having been crossed. The switch-pole is adjustable so that the amount of switch-arm travel necessary for switching to occur, and thereby the pressure threshold level, can be varied.

In a particular embodiment the switch-pole comprises a cylindrical member disposed parallel to the distributed resistance element, the outer surface of the cylinder being divided between electrically conductive and non-conductive portions. An electrically conductive lever carries a pair of wiper arms, one of which wipes against the resistance element and the other of which wipes against the surface of the cylinder. Displacement of the pressure sensing means in response to pressure changes causes the lever to pivot and wipe the two arms against their respective contact surfaces. The threshold detect circuit is activated when the wiping arm for the cylinder crosses the boundary between the cylinder's conductive and non-conductive surface portions, the cylinder being rotatable about its longitudinal axis so as to vary the location of the boundary relative to the wiper arm and thereby adjust the level of the threshold pressure.

DESCRIPTION OF THE DRAWINGS

Further advantages and features of the invention will be apparent to those skilled in the art from the ensuing detailed description thereof, taken together with the accompanying drawings, in which.

DETAILED DESCRIPTION

Figure 1A:
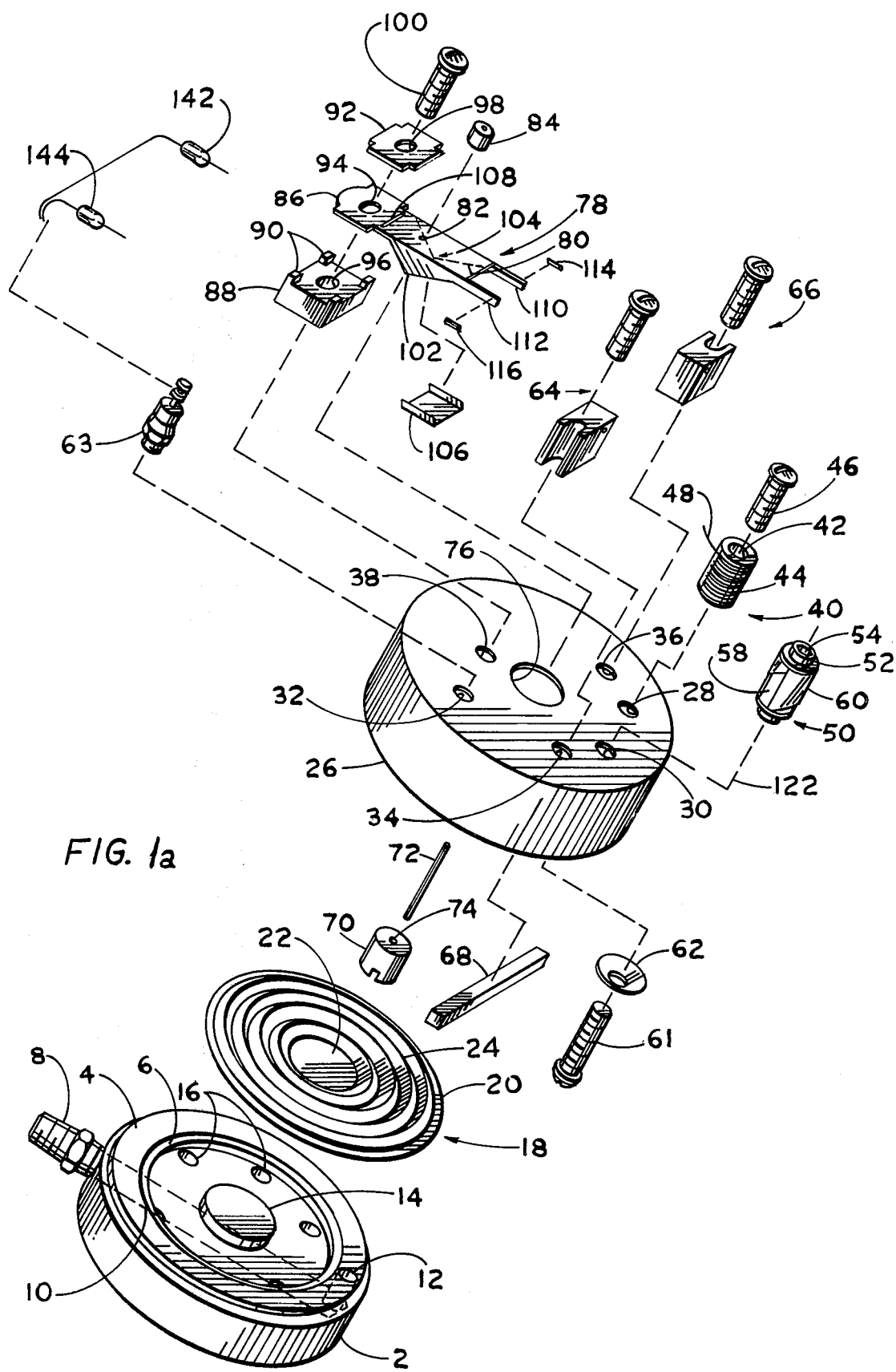
FIGS. 1a and 1b together comprise an exploded view of a dual function pressure transducer constructed in accordance with the present invention.

Referring first to FIGS. 1a – 3, the component parts of a dual function transducer constructed in accordance with the present invention are shown. A disc-shaped base fixture 2 is provided along its upper surface with an annular ring 4 having a ledge 6 that extends along its inner wall. A hollow nipple 8 having gas ports at each end is threaded into a bore 10 that extends from the side wall of base 2 diametrically through the base to a location below ring 4 on the opposite side thereof, and communicates with the upper surface of ring 4 via a channel 12. A smaller disc 14 having a height equal to that of ring 4 is carried centrally on the upper surface of base 2, while a plurality of holes communicating between the upper and lower surfaces of base 2 are distributed adjacent to the inner wall of ring 4.

Pressure is sensed by means of a resilient diaphragm 18 having an outer annular rim 20. A flat circular portion 22 is formed at the center of the diaphragm, separated from rim 20 by a series of annular corrugations 24. The exemplary diaphragm shown is formed from an approximately 0.004 inch thick sheet of material sold under the trade name NI-SPAN C by International Nickel Corporation, and may be constructed in accordance with the teachings of U.S. Pat. No. 3,625,116 for "Pressure-Sensing Diaphragm", assigned to the assignee of the present application. Rim 20 is welded to the upper surface of ledge 6 so that center diaphragm portion 22 is aligned with and slightly above disc 14, best shown in FIG. 3. Central diaphragm portion 22 is free to flex up or down as determined by the pressure level communicated to its upper surface through nipple 8, bore 10, and channel 12, relative to the ambient atmospheric pressure transmitted to its lower surface through holes 16.

Base 2 and diaphragm 18 are enclosed by a brass cover 26 that is attached to the outer circumferential wall of ring 4 by a suitable adhesive. Cover 26 has a plurality of openings 28, 30, 32, 34, 36, and 38, all of which are internally threaded with the exception of opening 30. A resistance element 40, comprising a hollow cylindrical mandrel 42 with a coil of resistance wire 44 distributed about its outer surface, is secured to the upper surface of cover 26 by a screw 46 inserted through the element and into opening 28. Element 40 is constructed by conventional means so as to present an outer surface that is exposed for wiping by an electrical contact. A terminal wire 48 is electrically connected to the upper end of resistance coil 44, the effective portion of element 40 at any given time being that part of coil 44 included between terminal wire 48 and a wiping contact to be described hereinafter.

A cylinder 50 functioning as a switch-pole is positioned parallel to and somewhat spaced from element 40, and comprises a hollow inner shaft 52 with a hexagonal socket 54 at one end and a threaded bore 56 (FIG. 3) at the other end; a cylindrical bobbin 58 formed from an electrically non-conductive material such as plastic molded around shaft 52, and an electrically conductive sheet 60 wound around the cylindrical surface of bobbin 58 so as to form a generally helical smooth boundary between the conductive and non-conductive surface portions of cylinder 50. The mechanism is held to cover 26 by means of a screw 61 threaded into hole 56 from the underside of the cover, with a spring washer 62 resiliently spacing the head of screw 61 away from cover 26. Spring washer 62 supplies a static torque to maintain the rotational position of cylinder 50, which can be adjusted by applying a sufficient torque to overcome the spring washer.

Also joined to cover 26 through openings 32, 34, and 36 are terminal posts 63, 64, and 66, respectively, which support lead wires associated with element 40 and cylinder 50. A rectangular brass strap 68 is soldered to the underside of cover 26 for strengthening.

Diaphragm 18 is coupled to the remainder of the transducer by means of a cylindrical fitting 70 which is cemented onto central diaphragm portion 22, and a stainless steel strut 72 cemented in a central opening 74 of fitting 70. Strut 72 extends upward through a central opening 76 in cover 26 to couple with a wiping mechanism, generally indicated by numeral 78, which includes a .004 inch thick metal level 80 having an opening 82 through which strut 72 projects, and a cap 84 fastening the strut in place. The rear portion 86 of the lever is slightly enlarged and squared-off so as to nest in a brass mounting block 88 having upstanding guard members 90 at each of its corners to prevent sideways rotation of lever 80. A brass stamping block 92 sits on top of lever portion 86, with openings 94, 96, and 98 formed in registry respectively through lever 80, block 88, and plate 92 to enable mounting of the assembly to cover 26 by means of a screw 100 which mates with cover opening 38. The intermediate portion of lever 80 is somewhat enlarged and bent downwards at each side to form a pair of flanges 102 and 104 across which a strenghtening bracket 106 is soldered. A slot 108 is formed in the lever just forward of rear portion 86 to facilitate bending of the lever about the slot axis.

Flanges 102 and 104 gradually taper in width toward the front of lever 80, then extend forward to form a pair of wiper arms 110 and 112 each of which can be flexed generally parallel to the plane of lever 80. Half-rounded pellets 114 and 116, each formed from an electrically conductive material suitable for wiping against an adjacent surface and having a 0.015 inch radius of curvature, are spot welded onto the outward-facing surfaces of arms 110 and 112, respectively. When the wiping apparatus 78 is affixed to cover 26, arms 110 and 112 are located between element 40 and cylinder 50 and slightly inwardly flexed by contact therewith (best shown in FIG. 2). As will be seen hereinafter, lever 80 in conjunction with arm 110 and pellet 114 serves as a switch-arm that coordinates with switchpole cylinder 50 to indicate when the pressure sensed by diaphragm 18 crosses a selectable threshold magnitude.

Figure 1B:
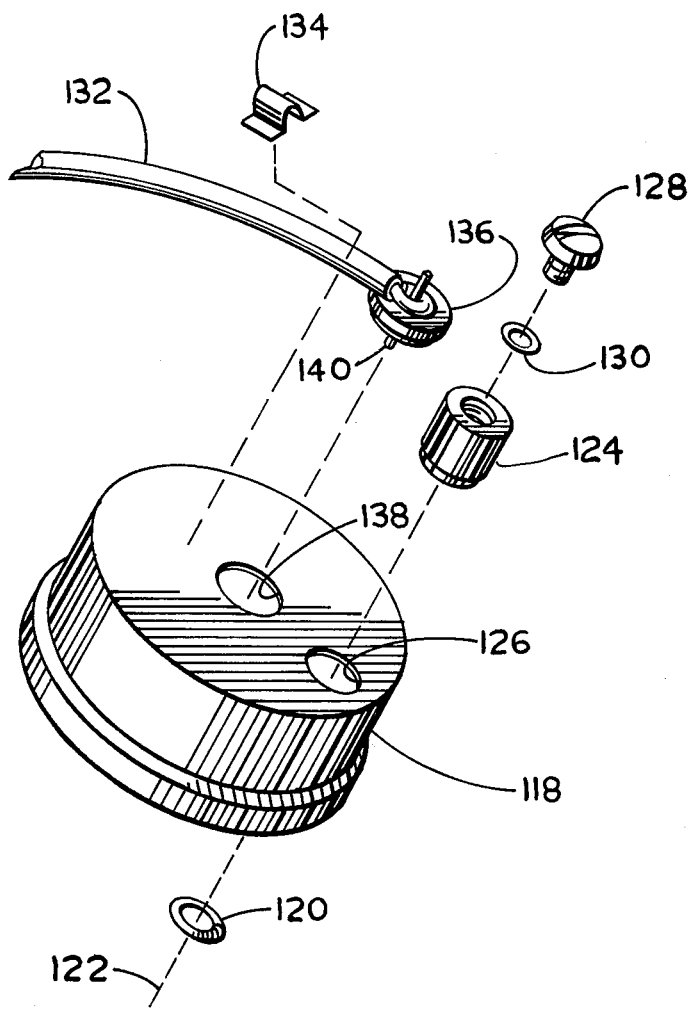
Figure 2:
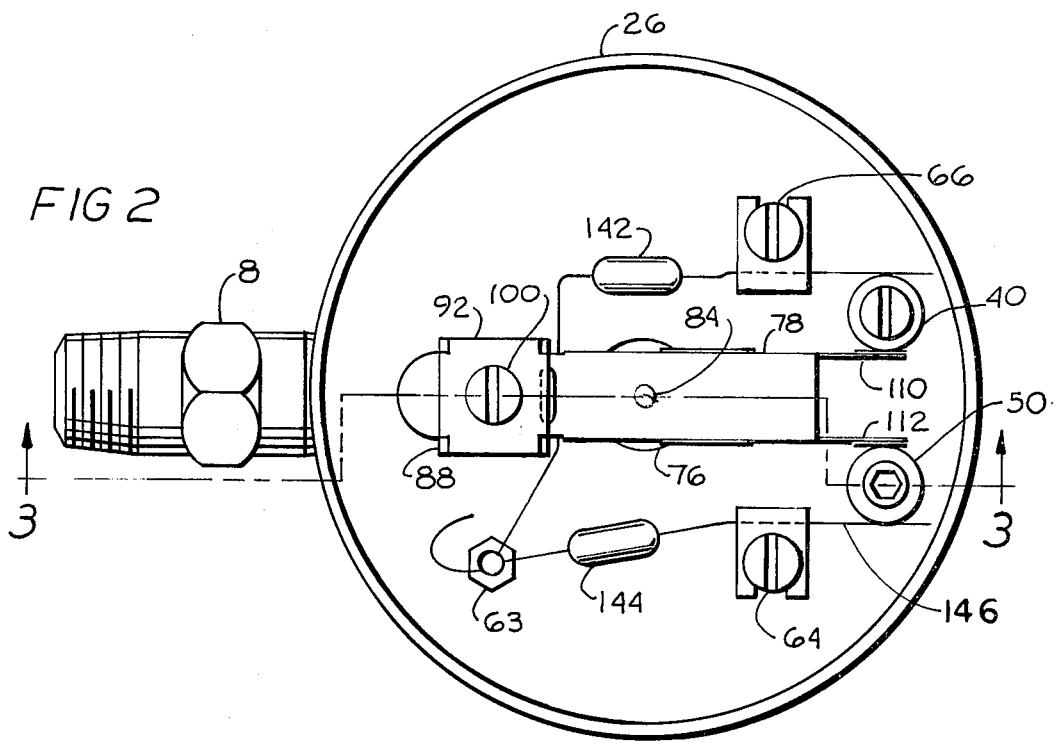
FIG. 2 is a plan view of the transducer with the cover removed.
Figure 3:
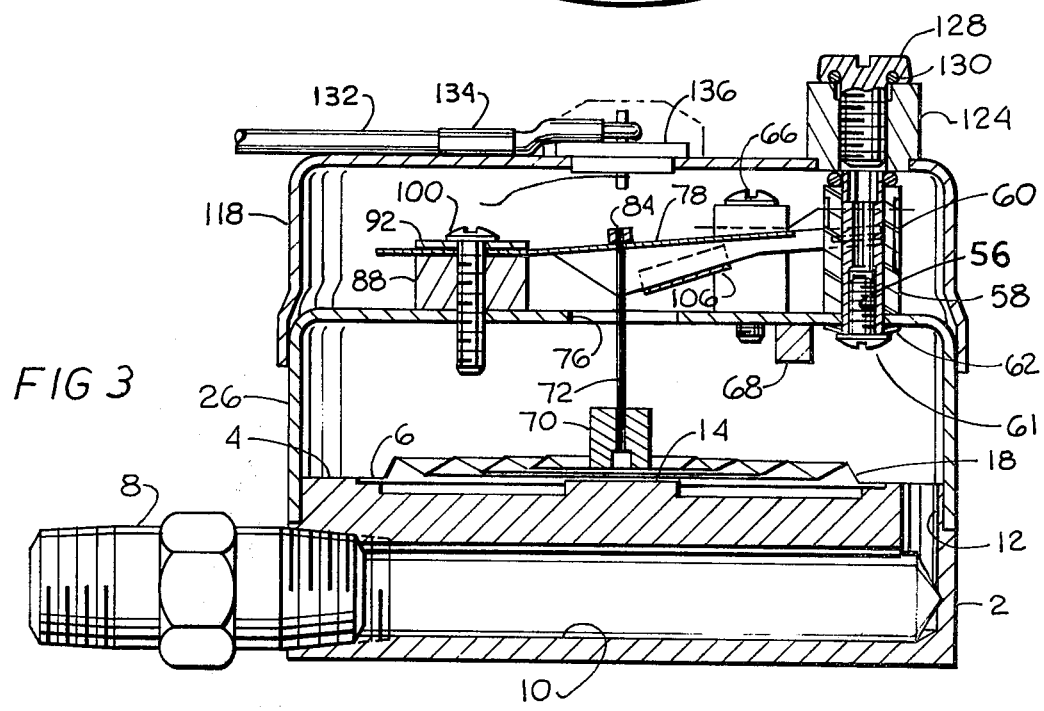
FIG. 3 is a cross-sectional view of a completely assembled transducer taken along the line 3—3 of FIG. 2.

Referring now to FIGS. 1b and 3, a cap construction for the transducer is shown which includes a brass cap 118 that is press-fit onto cover 26. A butyl O-ring 120 is compressed between the underside of cap 118 and the upper surface of bobbin 58 (the center line of cylinder 50 being indicated by dashed line 122 for clarity) to seal the interior of the transducer from the external atmosphere while permitting cylinder 50 to be rotated. A brass fitting 124 is soldered into opening 126 in cap 118 in registry with O-ring 120 to facilitate access to cylinder 50 from outside the transducer. A seal screw 128 is threaded into fitting 124 and holds a silicone rubber O-ring 130 against the top of fitting 124 to normally seal the transducer.

An electrical connection with an external circuit is made by means of a lead wire 132 which is held onto the upper side of cap 118 by clip 134 and connected to the interior of the transducer by an electrical glass insulated header 136 that fits in a central cap opening 138 and a terminal pin 140 extending through header 136 and down through opening 138. The electrical circuitry of the transducer further includes a pair of diodes 142 and 144 connected in opposite polarity to terminal post 63, the other side of diode 142 being connected to element terminal wire 48, and the other side of diode 144 being connected by a lead wire 146 (shown in FIG. 2) to the upper portion of conducting sheet 60 on cylinder 50. Post 63 is also connected by another wire to header pin 140.

Another electrical circuit is created by various components of the transducer, all of which are formed from electrically conductive materials, without the need for additional internal wiring. This circuit begins at wiper arms 110 and 112 and extends successively through lever 80, mounting block 88, cap 26, base 10, and nipple 8. An external electrical connection with this circuit is made through the metal sheath of the cable with which the transducer is employed.

Figure 4A:
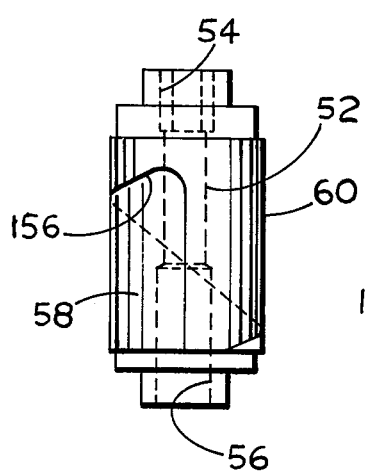
FIGS. 4a and 4b show details of an adjustable switch element employed in the threshold detect portion of the transducer.
Figure 4B:
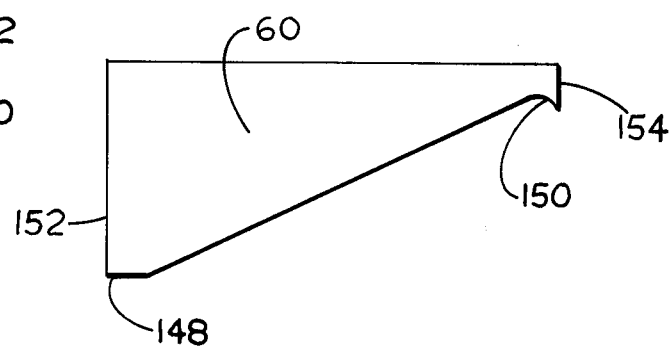

Details of switch-pole cylinder 50 are shown in FIGS. 4a and 4b. Conductive sheet 60 when laid flat is generally in the shape of a right triangle, with the lower edge 148 of the hypotenuse truncated and a downward extending lip 150 formed at the upper end of the hypotenuse to ensure a continuous strip of conductive material at the upper end of the switch-pole to connect with lead wire 146. The resulting conductive sheet has a long vertical edge 152 on one side and a short vertical edge 154 at the upper end of the other side. Cylinder 50 is conveniently formed by bending sheet 60 into a cylinder such that edges 152 and 154 abut each other but do not overlap. Shaft 52 is then positioned along the center line of the cylindrical sheet and plastic material molded between the two pieces to form bobbin 58. The resulting boundary line 156 between the conducting and non-conducting portions of cylinder 50 is canted away from the direction of movement exhibited by the surface of cylinder 50 when it is rotated about its axis, and is generally helical in shape, forming somewhat less than a full turn of a helix. The boundary curvature may depart somewhat from that of a true helix so long as it continues to progress from one end of cylinder 50 to the other as the cylinder is rotated.

Figure 5:
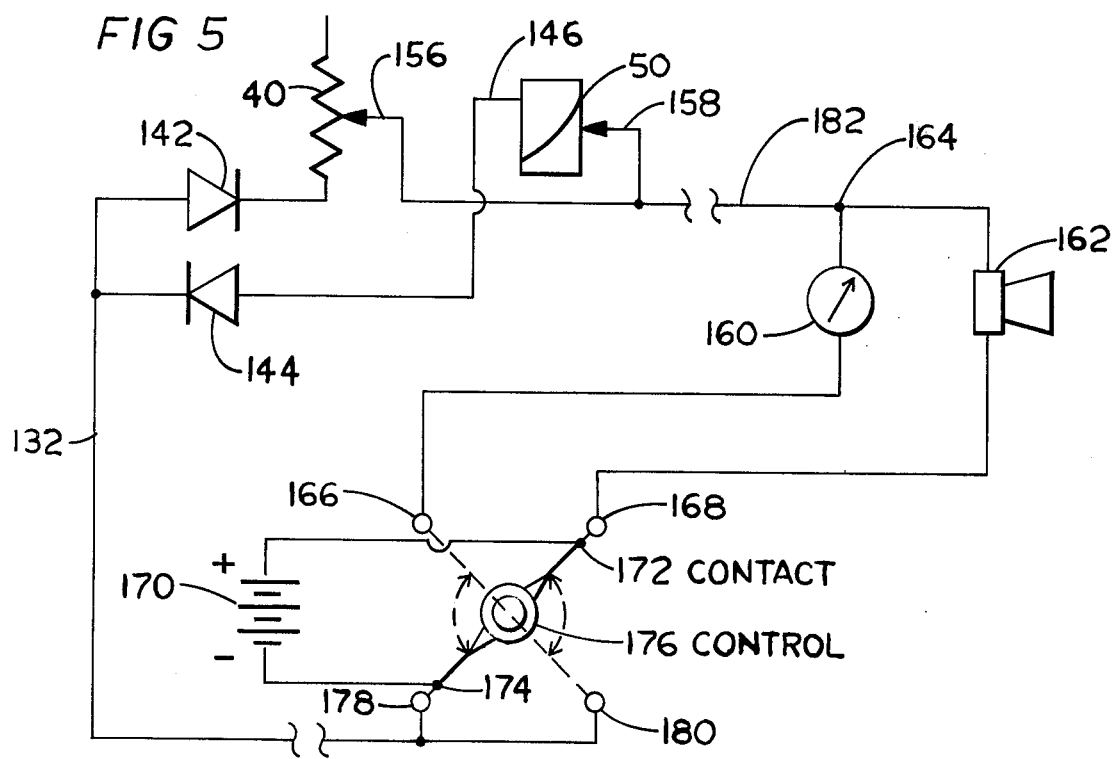
FIG. 5 is a somewhat idealized schematic diagram of an electrical interconnection between the transducer and a remote sensing station.

A circuit for connecting the transducer with a remote sensing station is indicated in FIG. 5. Element 40 and cylinder 50 are represented symbolically, with wiper arms 110 and 112 respectively indicated by arrows 156 and 158. The sensing station apparatus includes an ammeter 160 and a warning device such as buzzer 162 connected together at terminal 164 on one side and respectively to electrically isolated terminals 166 and 168 on the other side. The positive and negative terminals of a 45 volt battery 170 are respectively connected by lead wires to contacts 172 and 174, which contacts are rotated in tandem but electrically isolated by a control 176 that can be reciprocally rotated between a first position at which contact 172 connects with terminal 168 and contact 174 connects with another terminal 178, and a second position (indicated in dashed lines) in which contact 172 connects with terminal 166 and contact 174 connects with a different terminal 180. Terminals 178 and 180 are both connected to the transducer by a line that terminates in lead wire 132. Another line 182 which could be ground or cable sheath connects terminal 164 to the transducer base 2 and thereby to wiper arms 156 and 158 through the electrically conductive transducer components.

Ammeter 160 is thereby connected in a first electrical circuit with resistance element 40 and diode 142 to provide a readout of the portion of element 40 included in the circuit, as determined by the position of wiper arm 156 on element 40. This circuit, however, is not energized until control 176 is rotated to the position shown in dashed lines, applying a negative battery voltage to terminal 166 and a positive voltage to terminal 180. With control 176 in the position shown in solid lines, a second circuit comprising buzzer 162, wiper arm 158, the conductive surface portion of cylinder 50, and diode 144 is set for energization when wiper 158 contacts the conductive portion of cylinder 50. It can thus be seen that the transducer can operate both a readout and a warning device at a remote sensing station with only a two-wire or a single-wire and ground connection between the transducer and the station.

In operation, nipple 8 is threaded into the structure containing the pressure to be sensed. This pressure is transmitted through bore 10 and channel 12 into the area above diaphragm 18, which can then flex either upward or downward, depending upon the magnitude of the sensed pressure relative to the ambient pressure admitted to the underside of diaphragm 18 by holes 16 in base 2. Any motion of diaphragm 18 is transmitted via strut 72 to lever 80, which flexes primarily about slot 108. Wiper arms 110 and 112 are flexed slightly inwardly so as to wipe against element 40 and cylinder 50 respectively (via pellets 114 and 116) as lever 80 pivots up and down.

Assuming that the pressure initially sensed by diaphragm 18 is such as to place wiper arm 112 in contact with the non-conductive cylinder portion 58, and further that an indication is desired when the sensed pressure falls below a given threshold less than the initial level, sensing station control 176 is initially positioned as shown in solid lines in FIG. 5 to energize a threshold detect circuit that includes buzzer 162. This circuit is not complete, however, because wiper arm 112 does not contact the conductive sheet 60. If the sensed pressure now begins to fall, the pressure above diaphragm 18 will decrease while the pressure below the diaphragm remains constant, thereby forcing the central diaphragm portion 22 upward and concurrently flexing lever 80 upward via strut 72. When the pressure loss becomes great enough wiper arm 112 crosses the boundary and contacts conductive sheet 60, completing the external circuit and causing buzzer 162 to sound. An operator at the sensing station is thereby informed that the pressure has fallen below the threshold level, and can accordingly rotate control 176 to energize ammeter 160 and its associated circuit.

It can thus be seen that a switching function has been accomplished, with cylinder 50 serving as a switch-pole and lever 80 with attached arm 112 as a switch-arm.

Since wiper arm 110 has moved in tandem with arm 112, the resistance portion of element 40 now included in the circuit between arm 110 and diode 142 provides a measurement of the absolute pressure magnitude that can be directly read out by an appropriate calibration scale on ammeter 160. When the warning signal is detected, therefore, the operator can immediately obtain a reading of absolute pressure.

A change in the threshold detection level is readily accomplished by removing seal screw 128 and inserting an Allen (hexagonal head) wrench through fitting 124 into socket 54 of shaft 52 to rotate cylinder 50. Since lever 80 and wiper arm 112 are constrained to a constant reciprocal path as the sensed pressure fluctuates, the rotation of cylinder 50 alters the relative location of the boundary between the conductive and non-conductive portions thereof relative to the wiping path and thereby changes the absolute pressure level at which switching occurs. Because of hysteresis effects any adjustment of the switch setting should be done in several increments, at intervals of a few minutes. An adjustment can be accomplished by introducing the desired threshold pressure into the transducer and rotating the cylinder 50 until the detect circuit picks up, or by first approximating the desired setting (a calibration scale can be provided on the cylinder for this purpose), lowering the pressure within the transducer until pick-up occurs, and then correcting the switch setting for any differential between the actual and desired pick-up levels.

The transducer is thus capable of indicating when a pressure threshold has been crossed, as well as providing a readout of absolute pressure, with a simple mechanical structure that avoids the need for complicated and relatively expensive electronic circuitry. Adjustments in the threshold level can be made quite easily, without the necessity of replacing any parts or exposing the interior of the transducer to outside elements.

While a particular embodiment of the invention has been shown and described, numerous additional modifications and variations are possible in light of the above teachings. For example, if it is desired to detect the crossing of a pressure threshold in a positive rather than a negative direction, the conductive and non-conductive portions of cylinder 50 could be reversed, or the pressure of interest could be introduced to the underside of diaphragm 18. Variations in the external circuitry are of course also possible, such as operating an indicating device when the non-conducting rather than the conducting portion of cylinder 50 is contacted. The particular construction of lever 80 is also subject to considerable variation, its basic function being to serve as a switch-arm. For example, wiper arms 110 and 112 could be held further apart and wipe against element 40 and cylinder 50 from the outside rather than from in between. A further variation in construction but still within the scope of the invention would be the replacement of cylinder 50 with a two-position adjustable throw switch controlled by lever 80, or by an endless belt divided into conductive and non-conductive portions and supported by a pair of rotatable spools. It might also be desired to replace many of the metal structural components with molded plastic and then have an electrical connection with lever 80 by means of an additional lead wire brought into the transducer. It is therefore intended that the scope of the invention be limited only in and by the terms of the appended claims.

What is claimed is:

1. A dual function pressure transducer for providing a pressure readout signal and indicating the crossing of a pressure threshold comprising:
   a housing,
   a resistance element supported by said housing, said element having a wiping surface,
   a pressure sensing means having a member adapted for displacement relative to the magnitude of a sensed pressure,
   switch-arm means coupled to said pressure sensing means for movement thereby along a predetermined path,
   an electrical contact member carried by said switch-arm means and adapted to wipe against said resistance element when said switch-arm means moves along said path, and
   adjustable switch-pole means supported by said housing and cooperating with said switch-arm means to switch between first and second modes when said switch-arm means crosses a predetermined position, said switch-pole means being adjustable independently of said resistance element to vary said switching position,
   said contact member and element being connected in a first electric circuit the total resistance of which is determined by the relative position of said member along said element, thereby providing an indication of the pressure sensed by said sensing means,
   said switch-arm means and said switch-pole means being connected in a second electric circuit, whereby an indication of a sensed pressure crossing a selected pressure threshold level may be obtained by adjusting said switch-pole means so that switching occurs when the switch-arm means is at the position along its path corresponding to sensing of the selected pressure level by said pressure sensing means.

2. A dual function pressure transducer for providing a pressure readout signal and indicating the crossing of a pressure threshold comprising:
   a housing,
   a resistance element supported by said housing, said element having a wiping surface,
   a pressure sensing means having a member adpated for displacement relative to the magnitude of a sensed pressure,
   switch-arm means coupled to said pressure sensing means for movement thereby along a predetermined path,
   an electrical contact member carried by said switch-arm means and adapted to wipe against said resistance element when said switch-arm means moves along said path, and
   adjustable switch-pole means supported by said housing and cooperating with said switch-arm means to switch between first and second modes when said switch-arm means crosses a predetermined position, said switch-pole means comprising a cylindrical member rotatably supported by said housing, a portion of the outer surface of said member being electrically conductive and the remainder of said surface being electrically non-conductive, and including a generally helical boundary between said conductive and non-conductive portions, the position of said switch-arm means at which switching occurs thereby being adjustable and determined by the rotational position of said cylinder,
   said contact member and element being connected in a first electric circuit the total resistance of which is determined by the relative position of said member along said element, thereby providing an indication of the pressure sensed by said sensing means,
   said switch-arm means and said switch-pole means being connected in a second electric circuit, whereby an indication of a sensed pressure crossing a selected pressure threshold level may be obtained by adjusting said switch-pole means so that switching occurs when the switch-arm means is at the position along its path corresponding to sensing of the selected pressure level by said pressure sensing means.

3. A dual function pressure transducer for providing a pressure readout signal and indicating the crossing of a pressure threshold, comprising:
   a housing,
   a resistance element supported by said housing, said element having a wiping surface,
   a threshold pressure setting means supported by said housing, said means having a wiping surface divided into conducting and non-conducting portions, electric contact means adapted for reciprocal wiping against the wiping surfaces of both said element and said threshold setting means, means for adjusting said threshold setting means to shift its wiping surface and thereby vary the conductive portion thereof exposed for wiping, said conducting and non-conducting portions having a common boundary canted away from the direction of movement of said wiping surface whereby the location of said boundary relative to said contact means can be varied by adjusting the threshold setting means, a pressure sensing means having a member adapted for displacement relative to the magnitude of a sensed pressure, said member coupled to said contact means to move said contact means along a wiping path in response to changes in a sensed pressure, said contact means and resistance element being connected in a first electric circuit the total resistance of which is determined by the relative position of said contact means along said element, thereby providing an indication of the pressure sensed by said sensing means, and said contact means and the conductive surface portion of said threshold setting means being connected in a second electric circuit that is switched between a closed and an open state when said contact means traverses said boundary, whereby the threshold setting means can be adjusted so that the contact means traverses the boundary when a predetermined pressure is sensed.

4. The pressure transducer of claim 3, wherein said threshold pressure setting means comprises a cylindrical member rotatably supported by said housing, said conducting and non-conducting portions being formed on the surface thereof.

5. The pressure transducer of claim 4, wherein the boundary between the conducting and non-conducting portions of said threshold pressure setting means is generally helical in shape.

6. The pressure transducer of claim 5, wherein said helical boundary extends along said cylindrical member for substantially the full longitudinal length of said element.

7. The pressure transducer of claim 4, wherein said contact means includes a pair of stiffly flexible wiper arms, one of said arms positioned to wipe against said resistance element and the other of said arms positioned to wipe against said cylindrical member, said arms being slightly offset from their respective wiping surfaces so as to flex thereagainst during wiping.

8. The pressure transducer of claim 7, wherein said contact means includes a lever pivotably supported on said housing, said wiper arms being carried at one end of said lever, and said pressure sensing means being coupled to pivot said lever in response to sensed pressure changes, thereby causing said arms to move in wiping contact with said resistance element and threshold setting means.

9. The pressure transducer of claim 8, wherein said lever is formed from a conductive material and is included in said first and second electric circuits.

10. A dual function pressure transducer for providing a pressure readout signal and indicating the crossing of a pressure threshold from either direction comprising:

a housing, a resistance element supported by said housing, said element having a wiping surface, a pressure sensing means having a member adapted for displacement relative to the magnitude of a sensed pressure, switch-arm means coupled to said pressure sensing means for back and forth movement thereby along a predetermined path, said switch-arm means being moved in a first direction as the sensed pressure decreases and in the opposite direction as the sensed pressure increases, an electrical contact member carried by said switch-arm means and adapted to wipe against said resistance element when said switch-arm means moves along said path, and adjustable switch-pole means supported by said housing and cooperating with said switch-arm means to switch from a first to a second mode when said switch-arm means crosses a predetermined position in a first direction, and to return to said first mode when said switch-arm means crosses said predetermined position in the opposite direction, said switch-pole means being adjustable to vary said switching position, said contact member and element being connected in a first electric circuit the total resistance of which is determined by the relative position of said member along said element, thereby providing an indication of the pressure sensed by said sensing means, said switch-arm means and said switch-pole means being connected in a second electric circuit, whereby an indication of a sensed pressure crossing a selected pressure threshold level may be obtained by adjusting said switch-pole means so that switching occurs when the switch-arm means is at the position along its path corresponding to sensing of the selected pressure level by said pressure sensing means.

* * * * *